US008130651B2

(12) United States Patent
Williams et al.

(10) Patent No.: US 8,130,651 B2
(45) Date of Patent: Mar. 6, 2012

(54) ADDRESSABLE FIBER NODE

(75) Inventors: Christopher Pierce Williams, Potomac Falls, VA (US); Kenneth Gould, Oakton, VA (US)

(73) Assignee: Time Warner Cable, Inc., New York, NY (US)

( * ) Notice: Subject to any disclaimer, the term of this patent is extended or adjusted under 35 U.S.C. 154(b) by 616 days.

(21) Appl. No.: 12/208,687

(22) Filed: Sep. 11, 2008

(65) Prior Publication Data

US 2009/0047015 A1 Feb. 19, 2009

Related U.S. Application Data

(63) Continuation of application No. 10/463,088, filed on Jun. 17, 2003, now abandoned.

(51) Int. Cl.
*H04J 1/16* (2006.01)

(52) U.S. Cl. ........ 370/235; 370/252; 370/248; 370/347; 370/442; 370/468; 370/480; 725/25; 725/111; 725/113; 725/114; 725/117; 725/124; 725/129

(58) Field of Classification Search .................. None
See application file for complete search history.

(56) References Cited

U.S. PATENT DOCUMENTS

| | | | |
|---|---|---|---|
| 6,195,689 B1 | 2/2001 | Bahlmann | |
| 6,715,075 B1 * | 3/2004 | Loukianov | 713/176 |
| 6,725,462 B1 * | 4/2004 | Kaplan | 725/124 |
| 6,782,884 B1 * | 8/2004 | Chen et al. | 725/111 |
| 7,006,446 B1 * | 2/2006 | Anderson | 370/248 |
| 7,149,223 B2 | 12/2006 | Liva et al. | |
| 7,187,669 B1 * | 3/2007 | Lee | 370/347 |
| 7,327,679 B2 | 2/2008 | Naor et al. | |
| 7,672,332 B1 * | 3/2010 | Chapman | 370/468 |
| 2001/0055319 A1 * | 12/2001 | Quigley et al. | 370/480 |
| 2002/0062450 A1 * | 5/2002 | Carlson et al. | 713/200 |
| 2002/0090004 A1 * | 7/2002 | Rinchiuso | 370/468 |
| 2002/0100056 A1 | 7/2002 | Bortolini et al. | |
| 2002/0101630 A1 | 8/2002 | Nikolich | |
| 2002/0151308 A1 * | 10/2002 | Baba et al. | 455/446 |
| 2003/0202534 A1 * | 10/2003 | Cloonan | 370/468 |
| 2004/0045032 A1 * | 3/2004 | Cummings et al. | 725/111 |
| 2004/0090970 A1 | 5/2004 | Sanchez et al. | |
| 2004/0194147 A1 * | 9/2004 | Craven et al. | 725/111 |
| 2004/0215578 A1 * | 10/2004 | Das | 705/77 |

* cited by examiner

Primary Examiner — Hassan Phillips
Assistant Examiner — Ajay Cattungal
(74) Attorney, Agent, or Firm — The Marbury Law Group, PLLC

(57) ABSTRACT

A system and method for providing a hybrid fiber network (HFN) means to identify a fiber node by a unique address. An addressing module is installed in proximity to, or collocated with, a fiber node. The addressing module comprises an addressing module identifier that associates the addressing module with a particular fiber node. Network parameter values are received from the fiber node by the addressing module and reported to a reporting station.

8 Claims, 6 Drawing Sheets

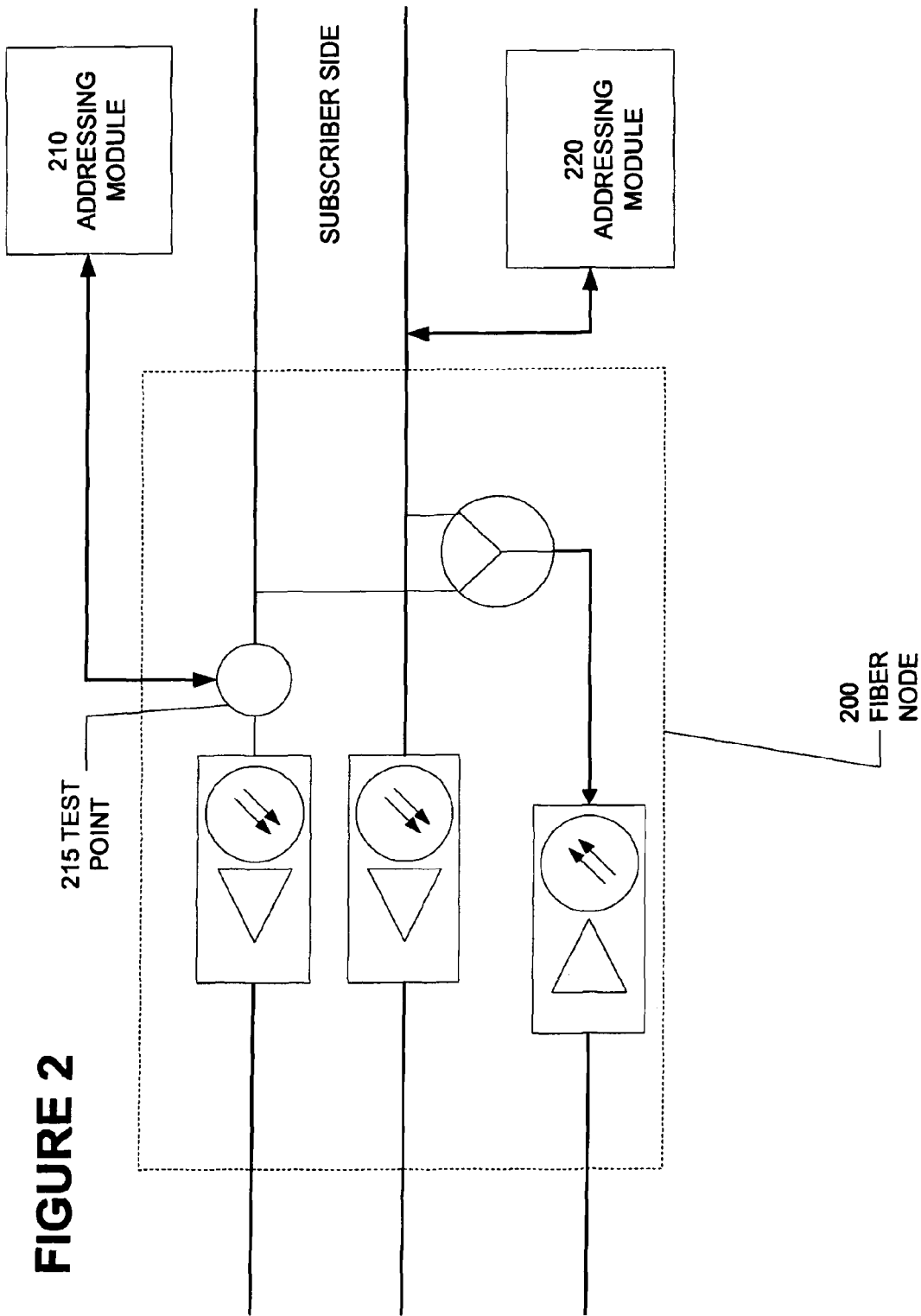

ADDRESSABLE FIBER NODE

RELATIONSHIP TO OTHER APPLICATIONS

This application is a continuation of U.S. application Ser. No. 10/463,088, filed Jun. 17, 2003 now abandoned, which application is incorporated by reference for all purposes and from which priority is claimed.

FIELD OF INVENTION

The present invention relates generally to the field of hybrid fiber-coax (HFC) networks. More particularly, the present invention permits an HFC cable network to identify a fiber node by a unique address.

BACKGROUND OF INVENTION

Wired broadband communication systems increasingly rely on fiber optical cables (fiber) for data transport. In the cable television environment, the network uses both fiber and coax (referred to as a "Hybrid Fiber-Coax" or "HFC" network). The signals run in fiber-optical cables from the cable head end to junctions near the subscriber (the "downstream" direction). At that point, the signal is converted from optical transmission over fiber to RF transmission over coaxial cables that run to a number of subscriber premises. These junctions are referred to as fiber nodes. Communications from the subscriber premises to the cable head end (the "upstream direction") are sent over coax to the fiber node where the signal is converted from an RF signal to an optical signal. The optical signal is then sent over fiber to the cable head end.

Access to the cable network's data service is provided through a cable modem (CM). Increasingly, CMs are required to comply with an industry standard referred to as the "Data Over Cable Service Interface Specification" or DOCSIS. DOCSIS provides a set of standards and a certifying authority by which cable companies can achieve cross-platform functionality in Internet delivery. A DOCSIS-compliant cable network comprises a cable modem termination system (CMTS) that forms the interface to an Internet service provider (ISP) and exchanges digital signals with cable modems on a cable network.

Referring to FIG. 1, a block diagram of a DOCSIS-compliant HFC network is illustrated. In a DOCSIS HFC network, fiber node 105 is connected to CM $FN_i$ 101 and CM $FN_n$ 102 and fiber node 110 is connected to CM $FN2_i$ 103 and CM $FN2_n$ 104. Fiber nodes 105 and 110 communicate in the upstream direction with an upstream port 125 of a CMTS 120. A downstream port 150 on the CMTS 120 communicates in the downstream direction with the CM $FN1_i$ 101, CM $FN1_n$ 102, CM $FN2_i$ 103, and CM $FN2_n$ 104 through fiber nodes 105 and 110.

Communication between the CMTS 120 and fiber nodes 105 and 110 in both the upstream and downstream direction is over a fiber network. Communication between the fiber nodes 105 and 110 and their respective CMs is over coaxial cable.

Each time a CM is powered on (or booted), the CM registers with an upstream port on the CMTS. As an element of this registration process, the Media Access Control (MAC) address of the CM is communicated to the CMTS. Using the MAC address, the CMTS associates each CM with an upstream port on the CMTS to which the CM is connected.

In contrast to CMs, fiber nodes are not addressable today, and as a result, they are an invisible component on the HFC network. That is, while fiber nodes are connected to a CMTS, the CMTS cannot communicate directly with the fiber node. Since the fiber node represents a physical domain in the HFC plant, it is valuable to associate that domain with the logical domain in a network. Currently, information about the health and configuration of a fiber node is obtained from the HFC plant engineers responsible for configuring and maintaining the HFC.

Fiber nodes vary in configuration and are described in terms of the segmentation of the receivers in the forward (downstream) direction and transmitters in the reverse (upstream) directions. The segmentation of the node is a design consideration that is determined in part by the volume and nature of the subscriber traffic anticipated by the cable service provider.

By making the fiber node addressable, diagnostic information from the fiber node about the HFC plant can be reported in real-time to the CMTS. In addition, the number of subscribers connected to a fiber node is determinable in real-time by the CMTS. These data would be valuable in determining the demand on upstream ports of a CMTS and in managing available bandwidth and the most efficient segmentation of each fiber node. As new services are deployed (e.g., voice over IP), the need to manage the downstream network is even more critical to efficient management of network resources. Determining the capacity per node—per port in real-time would be invaluable in provisioning new customers and scaling for the future.

For example, when deploying voice over using the Internet protocol (VOIP) it is necessary for a multi-system cable operator (MSO) to accurately estimate the number of phone calls that a single upstream CMTS port may experience so as not to exceed the call capacity of the port. By determining the number of fiber nodes that can be served by a single upstream CMTS port (the "upstream channel combining ratio"), and the number of homes-passed per fiber node (a measure of potential subscribers), an MSO is able to assess how many "homes passed" are connected to that CMTS port. Knowledge of the volume of calls passing through a fiber node in "real time" would allow the MSO to determine when adjustments to the upstream combining ratio would be appropriate. The information would also be helpful in better focusing marketing and sales initiatives within a particular neighborhood by providing the MSO with information about unused capacity.

Making the fiber node addressable would also improve the ability of the network operator to diagnose and remedy network problems. In the case where there are problems on a DOCSIS CMTS upstream port, being able to associate that port with a fiber node would allow the operator to track the symptoms back to a specific area, identify what fiber node(s) are affected by the problem, and enhance the ability to dispatch technicians to the appropriate location.

U.S. patent application 2002/0136203 by Lira et al. (the "Lira Application"), teaches integrating the functionality of a CMTS into the fiber node. The integrated CMTS/fiber node includes a MAC layer that presumably allows the integrated CMTS/fiber node to be addressable. While the integrated CMTS/fiber node appears to offer some of the benefits of an addressable fiber node, the solution of the Lira Application introduces other problems. By distributing the CMTS functionality closer to the end devices (CMs), the number of CMTS rises to the number of fiber nodes on the network thus increasing the probability of CMTS failure and making maintenance more difficult. Additionally, incorporating the CMTS into the HFC plant exposes these sensitive electronics to the elements and provides more opportunity for tampering. (In a typical HFC network, the CMTS is located at a hub site, which site is environmentally controlled and secure.) Finally, in order to provide an addressable fiber node using the approach described in the Lira Application, current networks would have to be redesigned.

What is needed is a means of addressing existing and new fiber nodes in an HFC network and obtaining from the fiber node information about signal levels and other characteristics of the cable plant without increasing maintenance risks or modifying the architecture of existing networks. It would also be useful to be able to determine the traffic volume being handled by a fiber node to determine the demand on an upstream CMTS port and to permit adjustment of the upstream combining ratio would need to be made.

SUMMARY OF INVENTION

An embodiment of the present invention is an addressable fiber node in an HFC network. The fiber node is made addressable by connecting a fiber node to an addressing module. This connection can be made on the subscriber side of the fiber node or by connecting the addressing module to a bi-directional test port associated with subscriber side of the fiber node. In another embodiment of the present invention the addressing module is integrated into the fiber node.

It is an aspect of the present invention to add addressing capability to the existing fiber node in a non-obtrusive manner.

It is another aspect of the present invention to connect an addressing module to the test port of an existing fiber node.

It is a further aspect of the present invention to connect an addressing module to the subscriber side of an existing fiber node.

It is still another aspect of the present invention to register fiber nodes with a CMTS.

It is another aspect of the present invention to integrate an addressing module into a fiber node.

It is yet another aspect of the present invention to obtain fiber node and network information from an addressable fiber node.

It is a further aspect of the present invention to determine the traffic volume passing through fiber nodes.

It is still an aspect of the present invention to isolate problems within fiber nodes and in the network downstream from fiber nodes.

It is another aspect of the present invention to determine the signal level at a fiber node.

It is yet another aspect of the present invention to assess characteristics of an HFC network.

It is still another aspect of the present invention to assess the performance of devices comprising the physical plant of an HFC network.

These and other aspects of the present invention will become apparent from a review of the general and detailed descriptions that follow.

An embodiment of the present invention is an addressable fiber node in a HFC network. The HFC network may, for example, be a DOCSIS-compliant network. However, this is not meant as a limitation. The fiber node is made addressable by connecting the fiber node to an addressing module. In this embodiment of the present invention, the fiber node is connected to an addressing module that has a unique addressing module identifier that associates the module with a particular fiber node. The addressing module identifier is reported to the CMTS using a registration process that is analogous to the process used by CMs to register with the CMTS. In another embodiment of the present invention the addressing module identifier of the addressing module is the MAC address of the addressing module. However, the present invention is not so limited. As would be apparent to those skilled in the art of the present invention, any system of addressing that performs the role of the unique addressing module identifier may be used without departing from the scope of the present invention.

In another embodiment of the present invention the fiber node/addressing module pair monitors the operating parameters of the fiber node. By way of illustration, these parameters include the bandwidth used by the cable modems associated with a particular fiber node/addressing module pair, peak bandwidth demand, and other signal-related data available from the test ports of the cable node to which the address module is connected. Other parameters that may be monitored in this way include the optical power, digitally modulated signals (QPSK, QAM, FSK) levels, analog video signal quality (depth of modulation, average power of carrier, audio deviation), RF Carrier Power, RF noise power, signal to noise, average noise power, carrier to noise, composite second order, composite triple beat, cross modulation (XMOD), hum, laser clipping, modulation index for the optical signal, phase or group delay, composite intermodulation noise, return loss, coherent disturbances (color phase, white level, video hum, video pass band response) peak to valley, video to analog delta measurement, differential gain and phase, and color measurements related to analog (gain, slope, padding, equalization, AGC voltage, current, impedance, transmission loss, ripple, frequency response variation, adjacent channel measurements, ingress measurements, common path distortion in upstream, optical dispersion, optical absorption, optical reflection, optical refraction, power supply duty cycle, and quasi sin wave duty cycle).

As will be apparent to those skilled in the art, the fiber node/addressing module pair may monitor other operating parameters without departing from the scope of the present invention. The operating parameters gathered by the fiber node/addressing module pair are reported to the CMTS for processing by network management tools. In another embodiment of the present invention the addressing module processes the operating parameters and reports the processed data to the CMTS.

In yet another embodiment of the present invention, a voice over Internet protocol (VoIP) phone number comprises an identifier that is associated with a specific fiber node. The fiber node/addressing module pair monitors downstream VoIP packets to determine if the packets are for delivery to a call recipient on connection to that fiber node. Packets that are not directed to call recipients downstream from the fiber node are discarded.

BRIEF DESCRIPTION OF THE DRAWINGS

FIG. 2 illustrates a block diagram of a typical fiber node with an addressing module connected to a test port of the fiber node and an addressing module connected to the subscriber side of the fiber node according to an embodiment of the present invention.

DETAILED DESCRIPTION OF THE PRESENT INVENTION

An embodiment of the present invention is a fiber node that is addressable and thereby visible on an HFC network. In one embodiment of the present invention a legacy fiber node is made addressable using an addressing module that has a unique addressing module identifier that associates the module with a particular fiber node. The addressing module is connected to the legacy fiber node via an RF-port on the subscriber side of the fiber node. In an alternate embodiment of the present invention the addressing module is connected to a test port on the fiber node.

Figure 5:
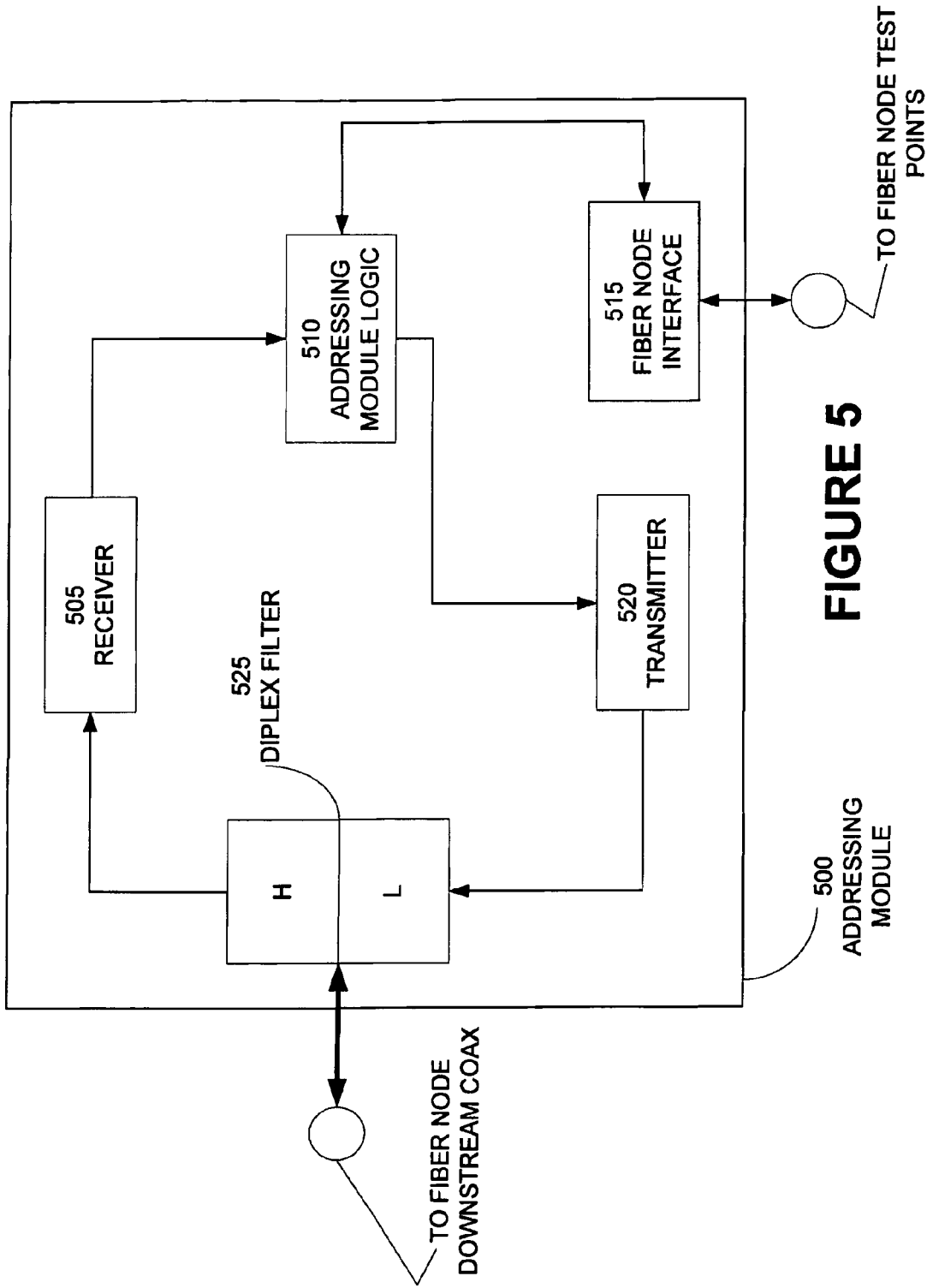
FIG. 5 illustrates a block diagram of an addressing module according to an embodiment of the present invention.

Referring to FIG. 5, an addressing module according to an embodiment of the present invention is illustrated. An addressing module 500 is connected to the downstream side of a fiber node. The signal is received by a diplex filter 525, which separates the downstream signal (typically 54 MHz and above) from the upstream signal (typically 42 MHz and below). A receiver 505 is connected to the high frequency side ("H") of the diplex filter 525. The downstream signal is an analog signal that has had information encoded in it by varying both the amplitude and phase of the wave. The receiver processes this signal through an analog-to-digital (A/D) converter. The A/D converter takes the signal, which varies in voltage, and turns it into a digital stream. The downstream signal from receiver 505 is supplied to the addressing module logic assembly 510 where the data content is processed through an error correction module and then converted to an appropriate protocol (such as 10baseT protocol) and sent to the fiber node interface 515. A transmitter 520 is connected to the low side ("L") of the diplex filter 525. The transmitter converts the digital signals from the fiber node interface to a modulated analog signal for transmission to the head end.

Within the addressing module logic assembly 510 is a media access controller (MAC). The MAC acts as the interface between the hardware and software portions of the various network protocols. Fiber node interface 515 permits the addressing module 500 to connect to the various test ports of the fiber node, converts the network metrics captured from the fiber node to digital signals, and responds to queries sent to it.

Figure 1:
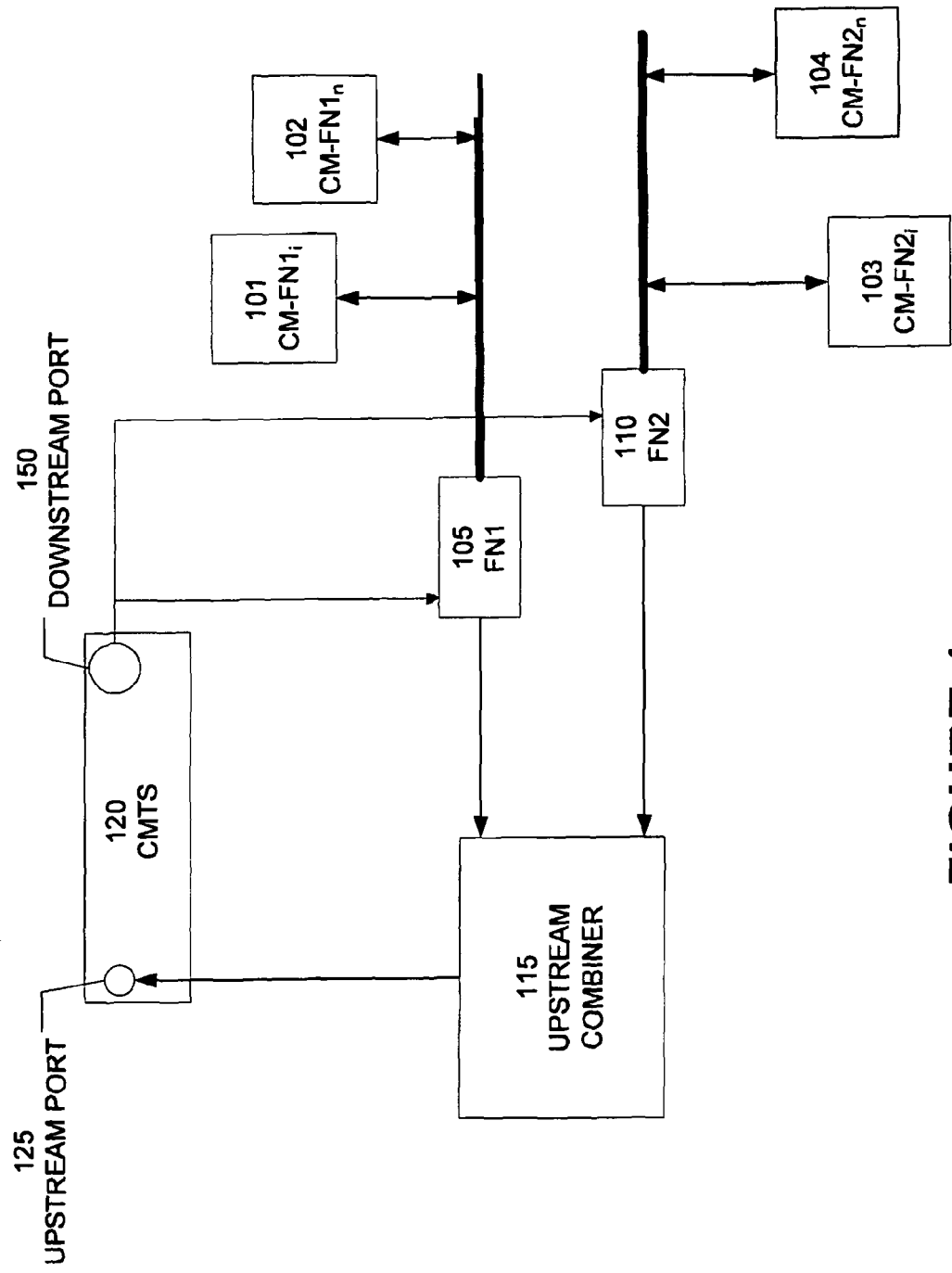
FIG. 1 illustrates a block diagram of a typical HFC network with a fiber node that is not addressable.

FIG. 2 illustrates a fiber node 200 with an addressing module 210 connected to a bi-directional test point 215 associated with the subscriber side of the fiber node 200. In this embodiment of the present invention the test port is used as a tap into the downstream (coax) side of the fiber node. Also illustrated in FIG. 2 is an addressing module 220 connected to the cable exiting the subscriber side of the fiber node 200. In this embodiment of the present invention the addressing module 220 is connected as close to the fiber node 200 as feasible. Both addressing modules 210 and 220 are DOCSIS compatible and adapted to register with port 125 on CMTS 120 (see FIG. 1) in accordance with the initialization process illustrated in FIG. 3.

Figure 3A:
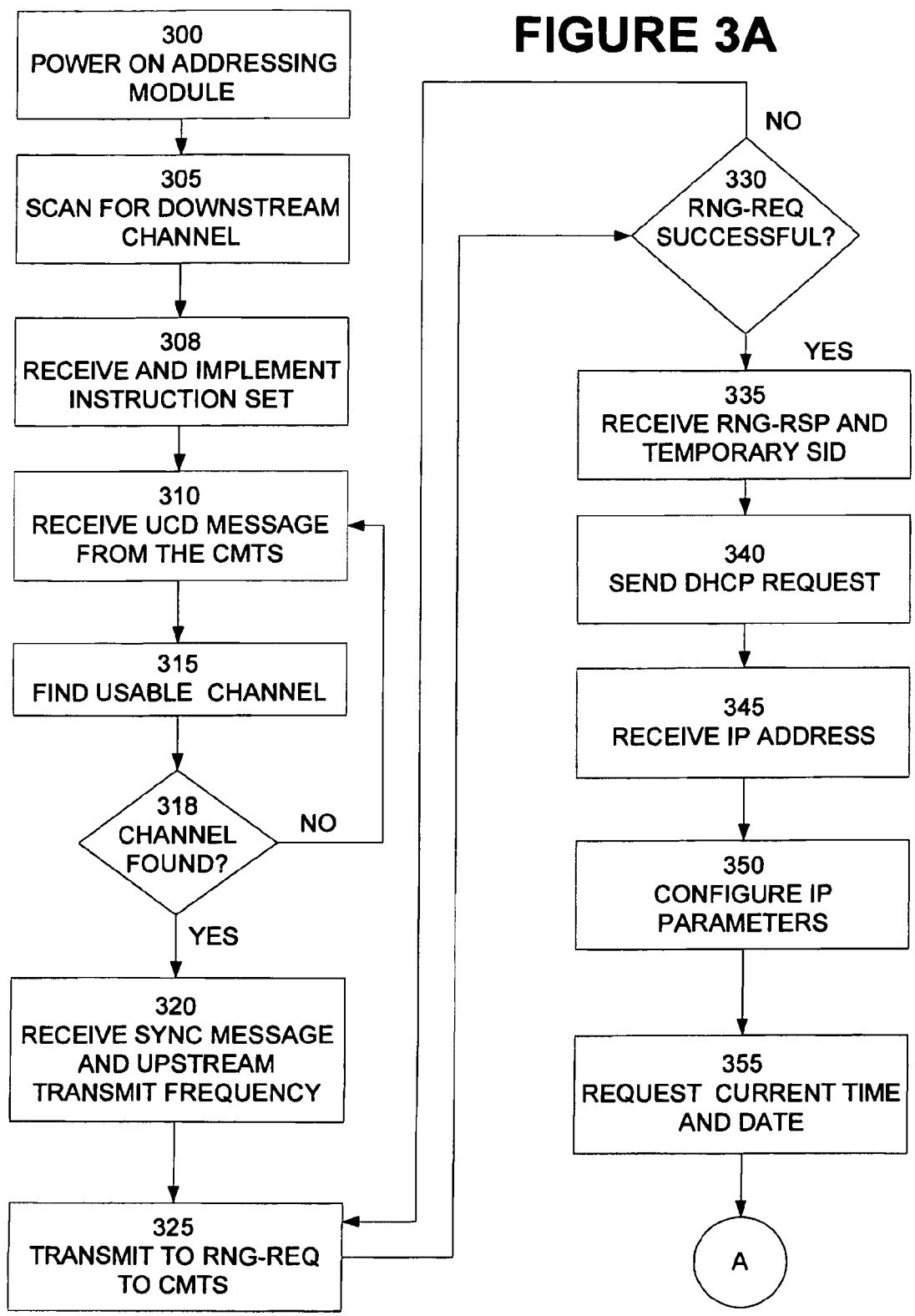
FIGS. 3A and 3B illustrate a block diagram of a fiber node incorporating an addressing module in accordance with an embodiment of the present invention.

Referring to FIGS. 3A and B, the initialization process of an addressing module according to an embodiment of the present invention is illustrated. The addressing module is initialized with the CMTS through a series of handshakes that comprise an exchange of data. The first procedure of provisioning is the initialization of the cable modem through the transmission of synchronization data from the CMTS.

Referring to FIG. 3A, the addressing module is powered on 300. It then scans the cable network for a downstream data channel 305 carrying a signal that the addressing module recognizes as coming from the CMTS. The signal from the CMTS comprises an instruction set used by the addressing module to communicate with the CMTS.

The addressing module receives and implements the instruction set 308. It then receives an upstream channel descriptor (UCD) message 310 from the CMTS. The CMTS periodically transmits this message to all addressing modules that it controls. The UCD provides the parameters concerning available upstream channels on which the addressing module may transmit. The addressing module stores the channel IDs it receives and examines each one until it finds a channel on which it can operate 315. If successful 318, the addressing module receives another timing SYNC message, extracts an upstream time stamp, and receives a bandwidth allocation message that identifies the upstream transmit frequency related to the selected channel 320. If a channel is not found, the addressing module again receives a UCD message from the CMTS 310 and the process continues.

Following acquisition of the UCD, SYNC, and the upstream transmit frequency, the addressing module is able to transmit to the CMTS an insertion packet 325 called a "ranging request" (RNG-REQ) that provides a service identification (SID) setting of zero. The addressing module transmits data at the lowest possible power and slowly increases it during each interval. If the RNG-REQ successfully reaches its destination 330, the CMTS immediately transmits a ranging response (RNG-RSP) 335 and assigns the addressing module a new but temporary SID. The CMTS also sends information to adjust the addressing module's timing, frequency and transmit power level. If the RNG-REQ is not successful, the addressing module again transmits an RNG-REQ to the CMTS 325 and the process continues.

The addressing module sends a dynamic host configuration protocol (DHCP) request to the CMTS 340 for an Internet protocol (IP) address and other parameters. The request includes the MAC address of the addressing module. The IP address enables the addressing module to establish its identity for receiving the downstream data addressed to it and for transmitting data from a known Internet address. The CMTS forwards the addressing module's request for the IP address to an available DHCP server at the headend. This server contains a database or pool of IP addresses allocated to the Internet devices on the network. The DHCP server responds through the CMTS with an IP address and other necessary data 345. The addressing module extracts this data from the message and immediately configures its IP parameters 350.

In an embodiment of the present invention, the MAC address of the addressing module comprises an identifier that is unique to addressing modules. By way of example and not as a limitation, the first three bytes of the MAC address normally used to identify the manufacturer of an addressable device comprise a code unique to addressing modules. In this embodiment of the present invention the DHCP assigns the addressing module an IP address from a block of addresses reserved for addressing modules. Communications to and from the addressing modules are regulated by permissions based on the assigned IP address. The last three bytes of the MAC address of the addressing module comprise a unique addressing module identifier. The addressing module identifier is associated with a particular fiber node input via a database. In an alternate embodiment of the present invention the addressing module identifier maps to a specific fiber node and a specific input on that fiber node.

The addressing module makes a request for the current time and date from one or more time-of-day (TOD) servers through the CMTS 355. This ensures that the addressing module and the CMTS have accurate time stamps that are attached to requests and responses between the two devices. These "events" are routinely logged in the network management system at the headend.

Figure 3B:
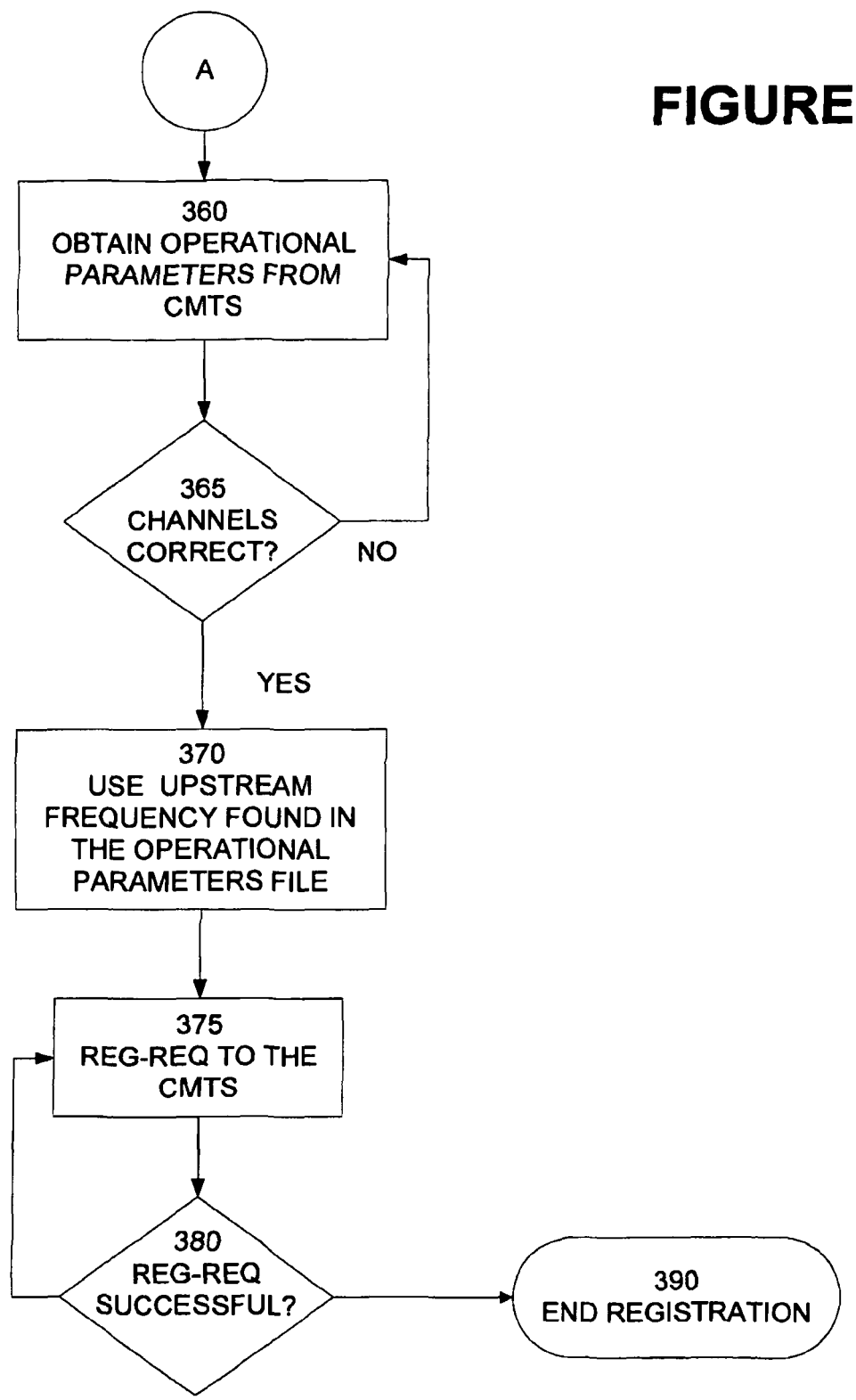

Referring to FIG. 3B, after the addressing module receives its IP address and accurate time, the addressing module obtains operational parameters (the "configuration file") from the CMTS 360 by downloading the data using the trivial file transfer protocol (TFTP) from a TFTP server designated for addressing modules. After downloading the file, the addressing module identifies the upstream and downstream channels in the file. If one or both channels are not the same ones on which it is currently operating 365, the addressing module reinitializes its relationship with the CMTS using the new upstream frequency found in the operational parameters file 370. If the channels are not correct, the addressing module again obtains operational parameters from the CMTS 360 and the process continues.

The final step is for the addressing module to become authorized to use the network for transmitting data. The addressing module sends a registration request (REG-REQ) to the CMTS. This REG-REQ includes the current service identification (SID), IP address, operational parameters, upstream and downstream channel IDs, time stamps, and other configuration settings 375. If the information is accepted 380, the CMTS responds with a new SID and completes the registration process 390. If the information is not accepted, the addressing module sends a REG-REQ to the CMTS 375 and the process continues.

In an embodiment of the present invention, the SID assigned by the CMTS is unique to addressing modules. The CMTS determines that the device sending the registration request is an addressing module from the IP address incorporated into the message. (As described previously, the IP address assigned to the addressing module by the DHCP is also unique to addressing modules.)

In another embodiment of the present invention, the addressing module monitors the traffic received at the fiber node input to which the addressing module is connected. The traffic information is logged and the information sent in the form of a message to the CMTS.

Figure 4:
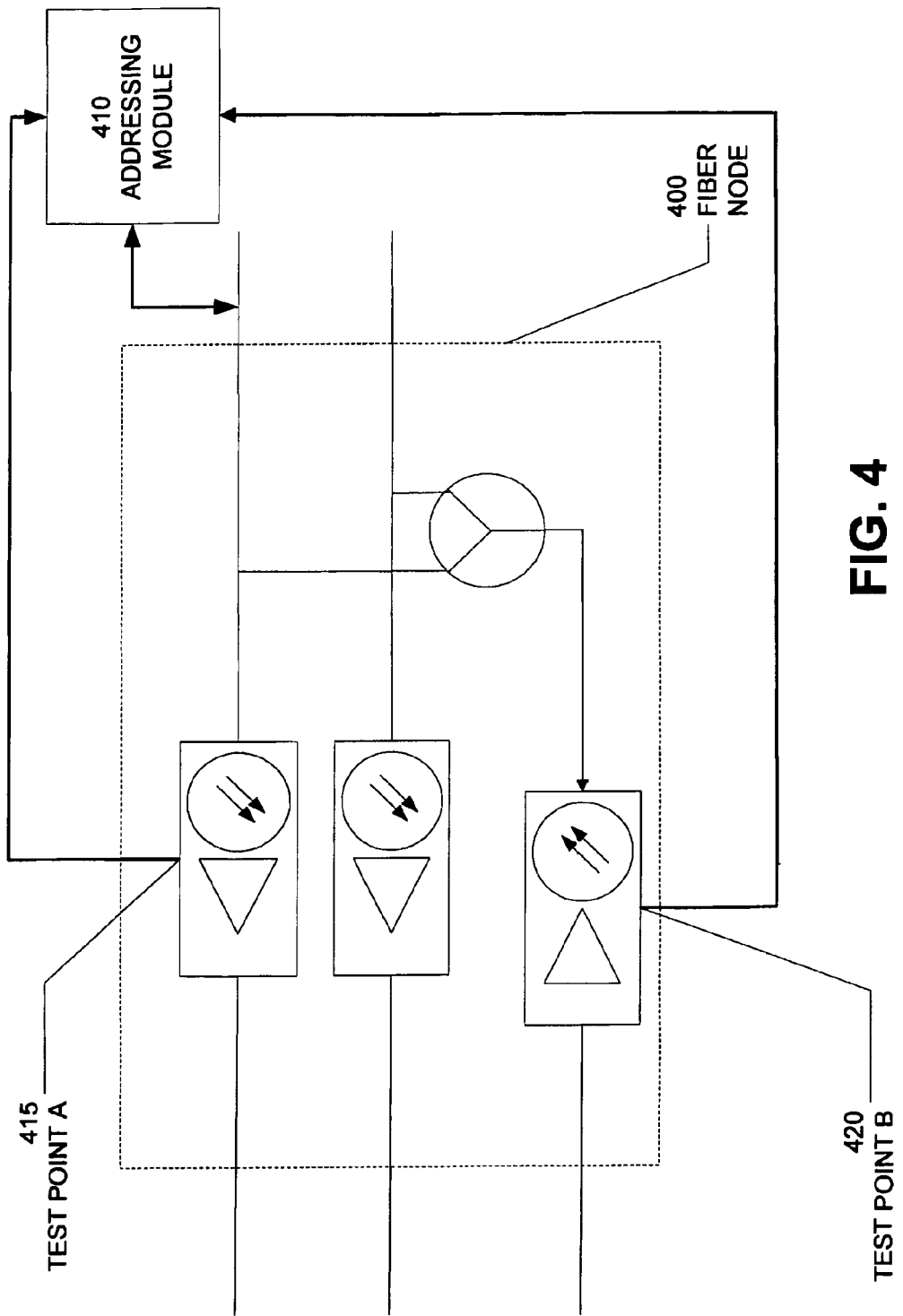
FIG. 4 illustrates an addressing module according to an embodiment of the present invention in which test ports on a fiber node are connected to an addressing module.

FIG. 4 illustrates an addressing module according to an embodiment of the present invention in which test points 415 and 420 on a fiber node 400 are connected to input ports on an addressing module 410. The data available from the test ports is monitored by the addressing module, logged, and sent to the CMTS. By way of example and not as a limitation, the fiber node 400 comprises a Motorola Starline® Scalable Optical Node model SG2440. Test points 415 and 420 permit monitoring a subscriber side RF signal (comprising both upstream and downstream signals), a downstream RF signal component, an upstream RF signal component, an upstream transmitter input level, and a downstream transmitter output level. In an embodiment of the present invention, the addressing module 410 is adapted to receive these signals and to processes them. In this embodiment of the present invention for each of the monitored signals, the addressing module determines the average and peak signal levels over a sampling period. These levels are digitized and sent to the CMTS for storage and evaluation.

In another embodiment of the present invention, the addressing module 410 is adapted to monitor and receive other parameters relating to the performance of the fiber node 400 and to the signals that pass through the fiber node 400. By way of example and not as a limitation, these parameters include the bandwidth used by the cable modems associated with a particular fiber node/addressing module pair, peak bandwidth demand, optical power, digitally modulated signals (QPSK, QAM, FSK) levels, analog video signal quality (depth of modulation, average power of carrier, audio deviation), RF Carrier Power, RF noise power, signal to noise, average noise power, carrier to noise, composite second order, composite triple beat, cross modulation (XMOD), hum, laser clipping, modulation index for the optical signal, phase or group delay, composite intermodulation noise, return loss, coherent disturbances (color phase, white level, video hum, video pass band response) peak to valley, video to analog delta measurement, differential gain and phase, and color measurements related to analog (gain, slope, padding, equalization, AGC voltage, current, impedance, transmission loss, ripple, frequency response variation, adjacent channel measurements, ingress measurements, common path distortion in upstream, optical dispersion, optical absorption, optical reflection, optical refraction, power supply duty cycle, and quasi sin wave duty cycle.

In another embodiment of the present invention, the addressing module takes advantage of the ability of a DOCSIS-compliant device to register IP addresses of devices connected to it. In an embodiment of the present invention each input port on the addressing module 410 is assigned an IP address, which is then associated with the test point connected to it. The addressing module receives these IP addresses during the configuration process (see FIG. 3, 375). In this way, the CMTS may poll the individual test ports of the fiber node 400.

In yet another embodiment of the present invention, a voice over Internet protocol (VOIP) phone number comprises an identifier that is associated with a specific fiber node. The fiber node/addressing module pair monitors downstream VoIP packets to determine if the packets are for delivery to a call recipient on connected to that fiber node. Packets that are not directed to call recipients downstream from the fiber node are discarded.

In an embodiment of the present invention, the configuration file comprises an "IQ" parameter that determines a level of monitoring and reporting the addressing module is capable of performing or, alternatively, a level of monitoring and reporting that address module is authorized to perform. By way of illustration and not as a limitation, an IQ parameter value of "1" indicates that the addressing module is capable/authorized to answer a simple query (a ping). An IQ parameter value of 2 indicates that the addressing module is capable/authorized to report network-related performance data. And an IQ parameter value of 3 indicates that the addressing module is capable/authorized to filter VoIP packets as previously described. As will be apparent to those skilled in the art, other levels of capability and authorization may be established for an addressing module without departing from the scope of the present invention.

Where the addressing module is capable of performing a higher level monitoring and reporting, the IQ parameter may be set by loading a new configuration file into the addressing module.

A system and method for addressing a fiber node in an HFC network has been disclosed. It will be understood by those skilled in the art of the present invention may be embodied in other specific forms, such as, but without limitation, a DOCSIS compliant network, without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A system for adjusting bandwidth demand on a port in a network comprising:
   a cable modem termination system (CMTS) connected to the network, wherein the CMTS comprises:
      an upstream port connected to the network, wherein the upstream port is connected to a combiner, wherein the combiner is connected to a plurality of addressable fiber nodes, wherein each addressable fiber node is accessible on the network via a network address and is adapted to receive measurement data from one or more test points internal to the addressable fiber node, and wherein each addressable fiber node is connected to a plurality of cable modems;
      instructions for:
         receiving in real-time from the plurality of addressable fiber nodes connected to the upstream port measurement data from the plurality of cable modems connected to the upstream port;
         determining from the measurement data when a bandwidth demand on the upstream port exceeds a first threshold value; and
         distributing the bandwidth demand among a plurality of other upstream ports on the CMTS when the demand on the upstream port exceeds the first threshold value.

2. The system of claim 1, wherein the instruction for distributing the bandwidth demand among the plurality of other upstream ports comprises:
   determining an upstream combining ratio of the combiner; and
   revising the upstream combining ratio to reduce the bandwidth demand on the upstream port to less than the first threshold value.

3. The system of claim 1, wherein the measurement data are indicative of a peak bandwidth from the plurality of cable modems connected to the upstream port.

4. The system of claim 1, wherein the instructions further comprise:
   determining from the bandwidth measurement data when the bandwidth demand on the upstream port is less than a second threshold value; and
   identifying the port as having available capacity.

5. A method for adjusting bandwidth demand on a port in a network, wherein the network comprises a cable modem termination system (CMTS), wherein the CMTS comprises an upstream port connected to the network, wherein the upstream port is connected to a combiner and wherein the combiner is connected to a plurality of addressable fiber nodes, and wherein each addressable fiber node is accessible on the network via a network address and is adapted to receive measurement data from one or more test points internal to the addressable fiber node, and wherein each addressable fiber node is connected to a plurality of cable modems, wherein the method comprises:
   receiving in real-time from the plurality of addressable fiber nodes connected to the upstream port measurement data from the plurality of cable modems connected to the upstream port;
   determining from the measurement data when a bandwidth demand on the upstream port exceeds a first threshold value;
   distributing the bandwidth demand among a plurality of other upstream ports on the CMTS when the demand on the upstream port exceeds the first threshold value.

6. The method of claim 5, wherein distributing the bandwidth demand among the plurality of other upstream ports comprises:
   determining an upstream combining ratio of the combiner; and
   revising the upstream combining ratio to reduce the bandwidth demand on the upstream port to less than the first threshold value.

7. The method of claim 5, wherein measurement data are indicative of a peak bandwidth from the plurality of cable modems connect to the upstream port.

8. The method of claim 7, wherein the method further comprises:
   determining from the bandwidth measurement data when the bandwidth demand on the upstream port is less than a second threshold value; and
   identifying the port as having available capacity.

* * * * *